(12) United States Patent
Seefeldt et al.

(10) Patent No.: US 10,873,060 B2
(45) Date of Patent: Dec. 22, 2020

(54) BATTERY CAN FOR A BATTERY

(71) Applicant: H&T Rechargeable LLC, Waterbury, CT (US)

(72) Inventors: Volker Seefeldt, Marsberg (DE); Florian Schröder, Marsberg (DE); Patrick Hefer, Marsberg (DE)

(73) Assignee: H&T Rechargeable LLC, Waterbury, CT (US)

( * ) Notice: Subject to any disclaimer, the term of this patent is extended or adjusted under 35 U.S.C. 154(b) by 16 days.

(21) Appl. No.: 16/288,332

(22) Filed: Feb. 28, 2019

(65) Prior Publication Data

US 2019/0273223 A1  Sep. 5, 2019

(30) Foreign Application Priority Data

Mar. 5, 2018  (EP) ..................................... 18160064

(51) Int. Cl.
*H01M 2/02* (2006.01)
*H01M 2/04* (2006.01)
(Continued)

(52) U.S. Cl.
CPC ......... *H01M 2/022* (2013.01); *H01M 2/0257* (2013.01); *H01M 2/0408* (2013.01);
(Continued)

(58) Field of Classification Search
CPC ......... H01M 10/0422; H01M 10/0431; H01M 10/0525; H01M 10/0587; H01M 2/022;
(Continued)

(56) References Cited

U.S. PATENT DOCUMENTS

| | | | | |
|---|---|---|---|---|
| 4,537,841 A | * | 8/1985 | Wiacek | H01M 2/1241 |
| | | | | 429/56 |
| 2006/0183019 A1 | | 8/2006 | Davidson et al. | |
| 2019/0148683 A1 | * | 5/2019 | Kwon | H01M 2/0408 |
| | | | | 29/623.2 |

FOREIGN PATENT DOCUMENTS

| | | |
|---|---|---|
| JP | 58-65758 U | 5/1983 |
| JP | 3-84850 A | 4/1991 |

OTHER PUBLICATIONS

European communication dated Apr. 26, 2018 in corresponding European patent application No. 18160064.4.

* cited by examiner

*Primary Examiner* — Victoria H Lynch
(74) *Attorney, Agent, or Firm* — Nields, Lemack & Frame, LLC

(57) ABSTRACT

The present invention relates to a battery can, in particular for a rechargeable lithium-ion battery, configured to receive an electrode assembly formed by winding an anode and a cathode that are isolated by a separator, wherein the battery can is configured to be closed by cap assembly. The battery can comprises a cylindrical can body for containing the electrode assembly and has a first end forming a base and a peripheral side wall extending from the base in a longitudinal direction to a second end of the can body comprising an opening, wherein the side wall of the can body ends in an end edge at the second end, and wherein the side wall of the can body is adapted to be crimped inwardly at the second end of the second end to attach a cap assembly that is inserted into the can body opening to the can body. According to the invention, the end edge of the peripheral side wall is formed in an inwardly extending loop into an annular shoulder surrounding the opening. The annular shoulder is configured such that when the can body sidewall is crimped (Continued)

inwardly at the second end to attach a cap assembly positioned in the can body opening to the battery can, the annular shoulder is bent inwardly such that the annular shoulder faces and engages the cap assembly positioned in the second end of the can body and such that the end edge of the side wall faces the inner side wall of the can body.

3 Claims, 4 Drawing Sheets

(51) Int. Cl.
     *H01M 10/04*      (2006.01)
     *H01M 10/0525*      (2010.01)
     *H01M 10/0587*      (2010.01)

(52) U.S. Cl.
     CPC ..... *H01M 2/0413* (2013.01); *H01M 10/0422* (2013.01); *H01M 10/0525* (2013.01); *H01M 10/0431* (2013.01); *H01M 10/0587* (2013.01)

(58) Field of Classification Search
     CPC . H01M 2/0257; H01M 2/0408; H01M 2/0413
     See application file for complete search history.

10,873,060 B2

BATTERY CAN FOR A BATTERY

TECHNICAL FIELD

The invention relates to a battery can, in particular for a rechargeable lithium-ion battery, configured to receive an electrode assembly formed by winding an anode and a cathode that are isolated by a separator, wherein the battery can is configured to be closed by cap assembly. The battery can comprises a cylindrical can body for containing the electrode assembly and has a first end forming a base and a peripheral side wall extending from the base in a longitudinal direction to a second end of the can body comprising an opening, wherein the side wall of the can body ends in an end edge at the second end, and wherein the side wall of the can body is adapted to be crimped inwardly at the second end of the second end to attach a cap assembly that is inserted into the can body opening to the can body.

BACKGROUND OF THE INVENTION

The increasing use in recent years of power supplies for portable and cordless electrical equipment, personal computers, portable communication devices and electric-powered vehicles brings new challenges for the manufacturers. A high energy density rechargeable battery system is currently a highly sought technology objective due to the demand for greater energy levels.

Rechargeable lithium-ion batteries are attractive energy storage systems for portable electronics and electric or hybrid-electric vehicles because of their high specific energy density compared to other electrochemical energy storage devices and their rechargebililty. However, as the energy density of batteries rises, their safety and reliability becomes increasingly important. When exposed to abusive electrical, thermal, or mechanical conditions, the active materials within the lithium-ion batteries break down exothermically, generating large amounts of heat which can lead to thermal runaway, accompanied by fire and/or explosion.

Lithium-ion batteries include an electrode assembly that comprises a separator made of a porous film and positioned between positive and negative electrodes (cathode and anode). In lithium-ion batteries of the cylindrical type, the separator, the anode and the cathode are spirally wound, with the anode and the cathode being kept apart by the separator. The electrode assembly is housed in a cylindrical can body of the battery can, said can body having a first end forming a base, and a peripheral side wall extending from the base in a longitudinal direction to a second end of the can body comprising an open end with an opening. The electrode assembly is inserted into the open end, which is later closed by a lid closure in the form of a cap assembly. The cap assembly plays an important role in the production of batteries since it carries a current output terminal, e.g., the positive output current terminal. Moreover, the cap assembly plays a significant role in terms of safety issues as it must provide an effective seal for the interior of the battery. Prolonged exposure of the battery interior, e.g., due to corrosion of the casing, may expose the battery components to the environment. Hermetic sealing is always a key issue in determining service life of a lithium-ion battery. For example, a high voltage of the battery may render water decomposition or oxygen reduction if water or oxygen molecules are present in the electrolyte. Such problems are often caused by improper cell sealing.

The battery can is regularly closed in a crimping process. Crimping is known as joining two or more pieces of metal or other ductile material by deforming one or both of them to hold the other. After the necessary battery interior components (e.g. the electrode assembly) have been inserted in the open end of the can body of the battery can, the cover assembly is inserted into the front end of the battery can and secured in place by crimping, i.e., by radially squeezing the side walls at the open end of the battery can inwardly against the cover assembly. The cover assembly is positioned in the can opening at a predetermined depth such that the side walls extend beyond the cover assembly at its circumference. Then, the open end of the side wall of the can body is bent inwardly (toward the base of the can body) such that the end face of the side wall, i.e., the upper edge or end edge of the can body at the opening, engages the cover assembly.

The cover assembly comprises a seal or a gasket. The seal may be provided on its outer circumference and upper and lower surfaces to engage the side wall surface. When the open end of the can body is bent inwardly during crimping, it exerts a clamping force on the cover assembly so that the sealing surfaces on the cover assembly are pressed against the inner side wall surface of the can body. In the crimping process, an inner annular shoulder may be formed at the inside of the container underneath the cover assembly to provide support for the cover assembly on the side thereof that faces the interior of the battery can.

The crimping process is a fast and economically efficient process suitable for high-speed battery manufacturing/assembling that uses prefabricated battery cans provided by suppliers. One drawback in the crimping process is that the end edge of the can body is formed by a cutting edge as a result of the can body manufacturing process. Usually, the supplied battery can is formed by drawing a metallic plate to form a cylindrical can body having a closed end and to cut part of the cylindrical can body at an opening thereof along its circumference.

The battery can as delivered to the battery assembly is crimped after the electrical components have been inserted in a final battery assembly step by bending the cutting edge over 90° inwardly such that the end of the side wall is pressed against the cover assembly and an inner surface of the can body side wall presses against the upper surface of the cover assembly. However, the cutting edge remains exposed to the environment. Here, the cutting edge may be subject to corrosion that impairs the sealing. Moreover, in some cases, the clamping force provided by the crimped edge of can body is not strong enough in case of high internal pressure forces in consequence of battery overheat due to defective functioning of the battery.

It is an object of the invention to provide a battery can for a rechargeable lithium-ion battery that offers an improved attachment of the cover assembly when the battery is assembled.

SUMMARY OF THE INVENTION

The object of the invention is achieved by a battery can as defined in claim 1. Preferred embodiments are subject matter of the dependent claims.

According to the invention, the end edge of the peripheral side wall is formed in an inwardly extending loop into an annular shoulder surrounding the opening. The annular shoulder is configured such that when the can body sidewall is crimped inwardly at the second end to attach a cap assembly positioned in the can body opening to the battery can, the annular shoulder is bent inwardly such that the annular shoulder faces and engages the cap assembly positioned in the second end of the can body and such that the end edge of the side wall faces the inner side wall of the can body.

In comparison to regular battery cans used as components in battery assembling, the invention provides for an improved sealing and a tight fit of the cover assembly when the battery is finally assembled, i.e., when the cap assembly is attached to the can body by crimping. While regular battery cans with straight side walls end abruptly in the end edge, the end edge according to the invention is already bent, respectively folded, inwardly toward the longitudinal axis of the can body. When the can body side wall is crimped and bent inwardly at the second end, due to the folded edge of the side wall, the annular shoulder engages the cap assembly, while the end edge is being oriented towards the side wall at the respective shoulder portion and faces away from the longitudinal axis of the can body. Because the end edges are already oriented inwardly prior to the crimping process, the end edge is tilted away from the cover assembly when the respective annular shoulder section is bent inwardly, e.g., in upward direction (away from the base of the can body). The inwardly bent shoulder portion engages the cover assembly and biases against the sealing of the cap assembly so that the cap assembly is fixed in place in the opening and the crimp connection is sealed.

As the end edge is located inside the battery, the end edge is effectively protected against the environment and corrosion.

Moreover, because the end edge is preformed, the annular shoulder provides more stiffness and strength, which contributes to the clamping forces for the cap assembly.

When viewed along the longitudinal direction of the can body, the shoulder annularly surrounds the opening. In cross section (perpendicular to the longitudinal direction), the end edge may form a shoulder with a round shape. The end edge may be rolled to form a loop. However, the end edge may also be folded, so that two sections of the side wall are placed side by side and in contact with each other. The annular shoulder may have a section with a round outer contour in the bent section.

Preferably, the end edge is bent inwardly in such a way, that the annular shoulder forms the end face of the can body in the longitudinal direction.

As indicated above, the end edge may be formed by a cutting edge of the can body. The end edge comprises an edge surface which constitutes the forward end face of the side wall of the can body.

The battery can of the invention is particularly suitable for lithium-ion batteries. In the sense of the invention, the battery can is, of course, also suitable for other types of cylindrical batteries such as nickel-cadmium batteries or the like.

According to a further embodiment of the invention, the loop is formed such that the end edge contacts the inner side wall of the can body. This may be achieved by folding or rolling up the end edge inwardly. By providing a contact between the inner side wall of the can body and the end edge, the protection of the end edge against corrosion is improved. Further, the stiffness and stability of the annular shoulder section participates from this construction.

According to yet a further embodiment of the invention, the annular shoulder is formed such that the inner opposing side wall surfaces of the inner annular shoulder abut each other to minimize an inner space of the annular shoulder. This embodiment may be implemented by folding the end section of the can body side wall into a double layer arrangement with inner side wall sections contacting each other.

According to a further embodiment of the invention, the opening, i.e., the section of the side wall comprising the annular shoulder is widened in a radial outward direction with respect to the remaining part of the can body side wall or with respect to the longitudinal axis of the can body in order to enlarge the opening for insertion of the electrode assembly.

According to yet a further embodiment of the invention, the annular shoulder is configured such that during crimping the annular shoulder forms a substantially flat outer surface in the longitudinal direction of the battery can. The flat annular surface is suitable for attaching an current output terminal or the like. For example, the positive current output terminal can be provided on the cap assembly, as regularly done. The negative output terminal, however, may be provided on the outer flat annular surface. Increasing the surface area and providing a large outer surface in the front end of the battery can side wall offers mounting capacities. For example, the comparatively large surface area allows for attachment of cooling means, such as a cooling plate, in order to dissipate heat from the battery, which may arise during fast loading or unloading. Battery thermal management considerably participates from this battery can construction.

The invention also relates to a method of producing a battery can as described herein for later assembly of a battery, wherein a sheet metal blank is radially drawn into a forming die by the mechanical action of a punch to form a cup, and wherein the cup is further drawn by a series of repetitive deep drawing steps using a press to form a cylindrical can member comprising a first end, a second end with an opening, and a peripheral side wall extending along a longitudinal direction of the can member between said first and second end. The can member constitutes a preform of the can body. To process the can member into the can body, the method further comprises the step of bending the end edge at the second end of the can member radially inwardly such as to form an annular shoulder. With the annular shoulder, the now formed can body may be equipped with the electrode assembly and the cover assembly in a subsequent battery assembly step.

According to a further embodiment of the invention, the method of producing a battery can as described herein further comprises the step of widening the second end of the can member to enlarge the opening of the can member.

The invention also relates to a battery, in particular a lithium-ion battery, comprising a battery can as described herein. The battery includes an electrode assembly accommodated in the battery can and formed by winding an anode and a cathode that are isolated by separator. The second end of the side wall is crimped and the annular shoulder of the side wall is bent inwardly and engaged with the cap assembly to attach the cap assembly to the can body. The end edge of the side wall of the can body is bent away from the cap assembly (resp. the longitudinal axis of the can body) and faces the inner side wall of the can body. As indicated above, the battery comprising a battery can as described herein shows an improved sealing efficiency. Moreover, this battery shows increased resistance against pressure bursting.

According to a further embodiment of the invention, the end face of the side wall of the second end forms an outer flat annular surface in the longitudinal direction of the can body. The end face is formed by the annular shoulder which is bent inwardly.

In line with the further embodiment of the invention, the cap assembly comprises a positive current output terminal and the annular shoulder comprises a negative current output terminal, or vice-versa.

BRIEF DESCRIPTION OF THE FIGURES

The invention will now be described referring to an exemplary embodiment shown in the Figures in which:

FIG. 1 shows a battery in different views. FIG. 1a is a perspective view of the battery 1 and FIG. 1b is a perspective cut view through the battery 1 of FIG. 1a.

Figure 1:
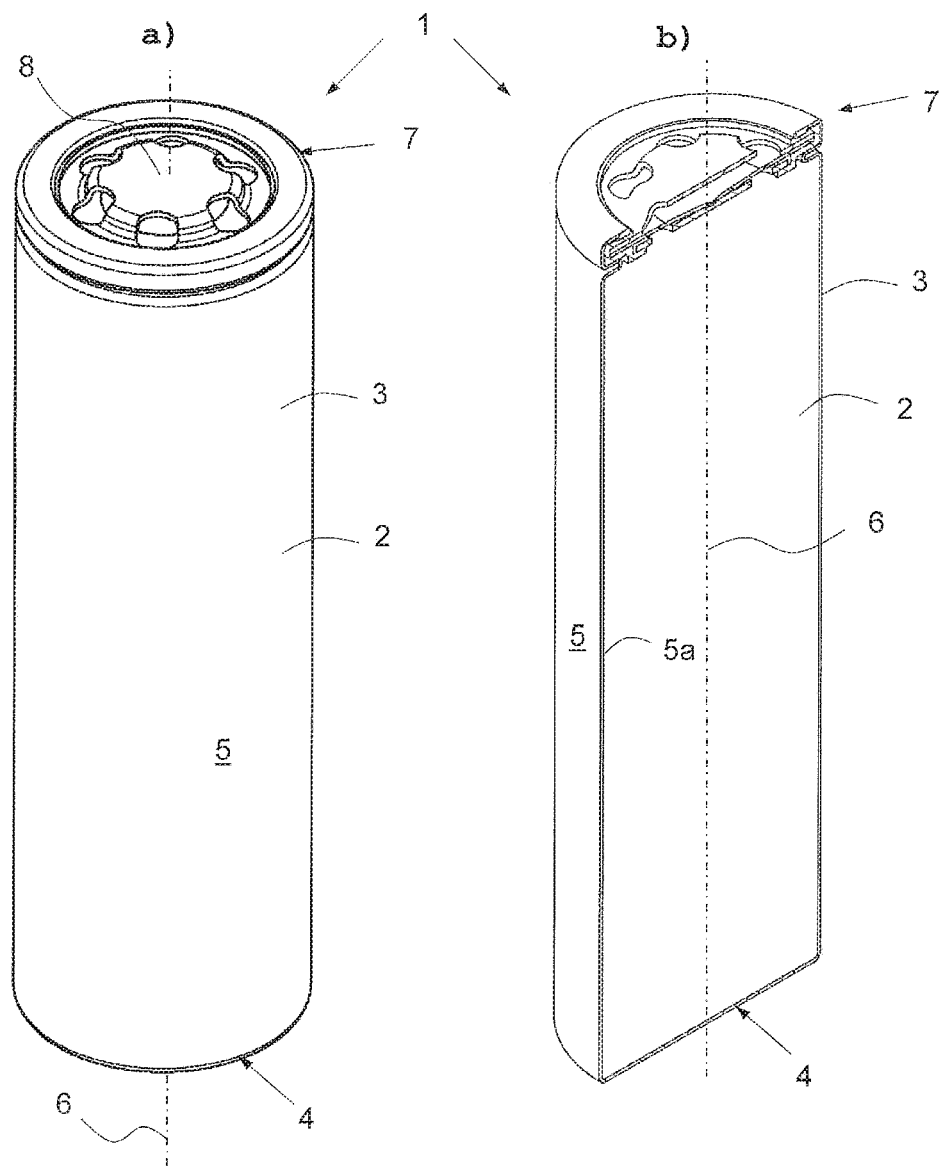
FIG. 1 shows a battery in accordance with an embodiment of the invention.

The battery 1 houses an electrode assembly, which is formed by winding an anode and a cathode that are isolated by separator. The battery comprises a battery can 2 having a cylindrical shape and serving as housing for the electrode assembly. The battery can generally has a cylindrical can body 3. The can body 3 has a first (lower) end 4 forming a base and a peripheral side wall 5 extending from the first end 4 in a longitudinal direction along a longitudinal axis 6 of the can body to a second end (upper) 7 of the can body 2, which is open.

The second end 7 is closed by a lid in the form of a cover assembly 8. The cover assembly seals the interior of the battery against the environment.

The cover assembly 8 is attached to the can body 3 by crimping during which an upper portion of the side wall 5 is bent inwardly over an upper section of the cover assembly 8. Further, a section of the side wall located below the cover assembly 8 is bent inwardly to form an annular collar in the form of an inner projection of the inner side wall of the can body 3 to secure the cover assembly 8 in place and to seal the battery 8.

Figure 2:
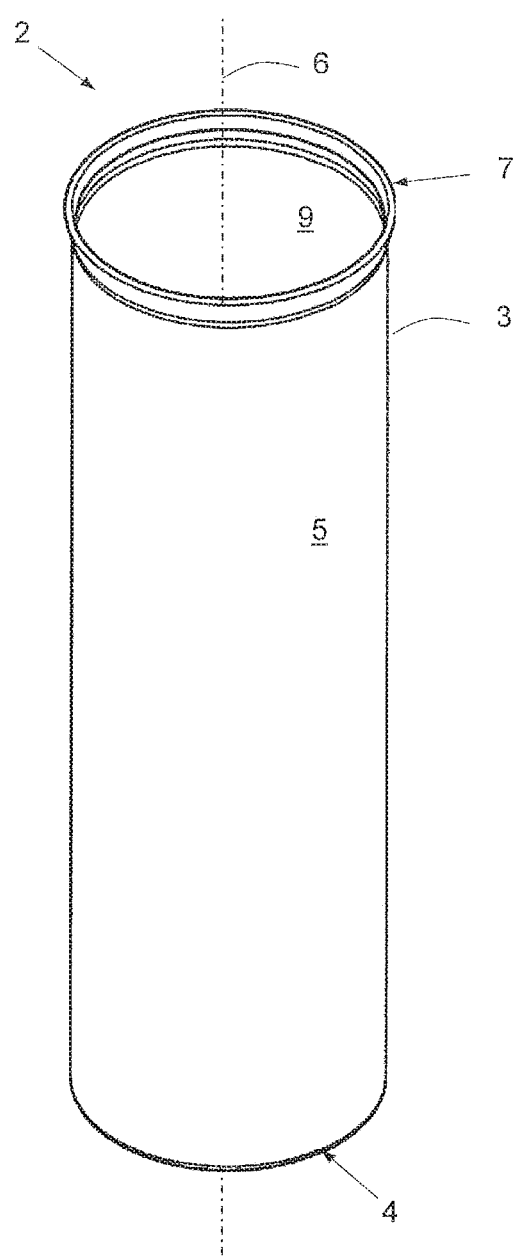
FIG. 2 shows in a perspective view a battery can for the battery in FIG. 1.

FIG. 2 shows the battery can 2 prior to the assembly to the final battery, meaning that the electrode assembly parts have not yet been inserted into the interior of the battery can 2. Further, the battery can 2 is not yet closed by the cover assembly.

As indicated above, the can body 3 extends from the first end 4 along the longitudinal axis 6 to the second end 7. The second end 7 has an opening 9 for later insertion of the electrode assembly.

Figure 3:
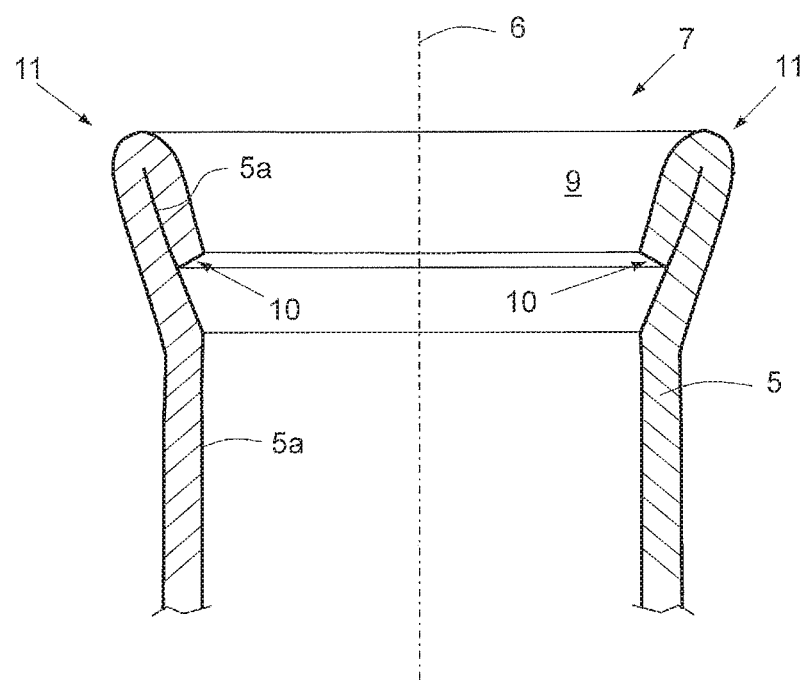
FIG. 3 shows in a cut view a section of the battery can in FIG. 2.

FIG. 3 is a schematic cut view of the upper section of the can body 3 in FIG. 2 at the second end 7. The peripheral side wall 5 extends from the base to the second end 7 and ends in an end edge 10. The end edge 10 is a cutting edge produced in the manufacturing process of the battery can.

The end edge 10 of the peripheral side wall 5 is formed in an inwardly extending loop (toward the longitudinal axis 6) into an annular shoulder 11 surrounding the opening 9 such that two sections of the inner side wall 5a abut each other in the area of the annular shoulder. Moreover, the section of the side wall 5 comprising the annular shoulder 11 is flared, meaning that the opening is widened in a radial outward direction in relation to the remaining part of the can body side wall 5. The electrode assembly is easier to insert but also fits through the opening.

In the later assembly process of the battery, the annular shoulder 11 is crimped and bent inwardly against the top surface of the cover assembly to mount the cover assembly to the can body 3 and to secure the same in place. The mounted state is shown in FIG. 4.

Figure 4:
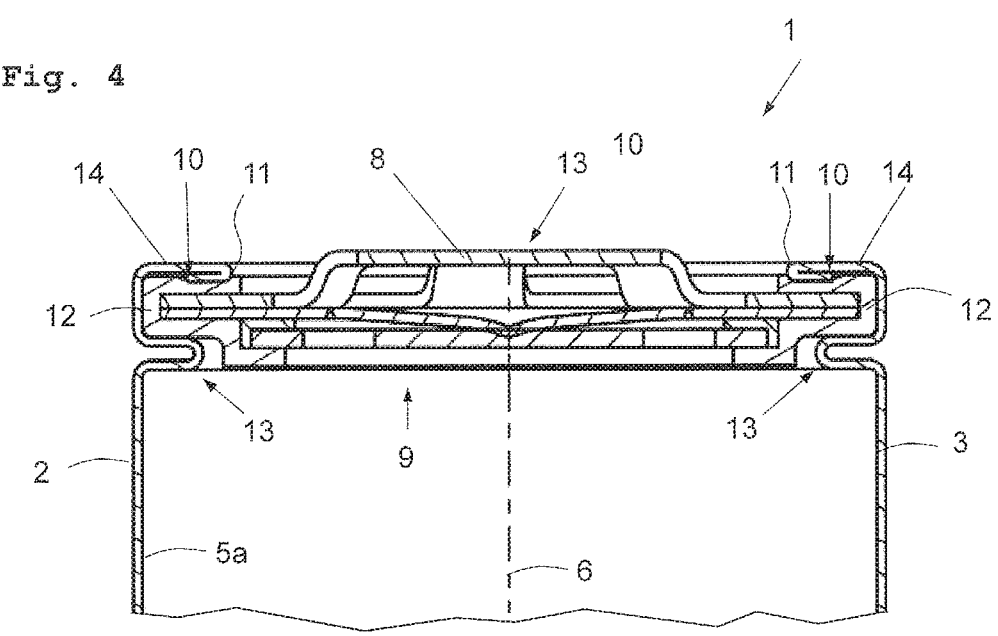
FIG. 4 shows in a cut a section of the battery in FIG. 1.

FIG. 4 shows the upper section of the assembled battery 1 of FIG. 1. The opening 9 is closed by the cover assembly 8. The cover assembly 8 comprises a seal 12 provided on the outer circumference of the cover assembly 8 and extending above and below the outer edge of the cover assembly 8 so that the seal 12 is also provided on an outer section of the top surface of the cover assembly 8 and on an outer section of the lower surface of the cover assembly 8.

During the battery assembly process, the cover assembly 8 is inserted into the opening 9 of the battery can, which is in the condition as shown in FIG. 3. In the crimping process, the side wall 5 of the can body 2 is squeezed radially inwardly such that an inner flange or collar 13 is formed on the inner side wall surface and the inner side wall 5a projects inwardly toward the longitudinal axis 6.

The flange 13 provides a support for the cover assembly 8 in downward direction. During crimping, the annular shoulder 11 is bent inwardly to engage the upper surface of the cover assembly 8 at the upper sealing section of the seal 12. The annular shoulder exerts a clamping force on the cover assembly 8 so that the sealing surfaces on the cover assembly 8 are pressed against the inner collar 13, the inner side wall 5 and the annular shoulder 11. Thereby, the cover assembly 8 is secured in place and the opening is sealingly closed.

Further, the end edge 10 of the side wall 5 faces the inner side wall 3a of the can body and is located in the interior of the battery where it is sealed off protected from environmental influences that may cause corrosion.

The cover assembly further comprises a positive current output terminal 13. The annular shoulder 11 forms an outer flat annular surface 14 in the longitudinal direction respectively at the end face of the battery. This enlarged section 14 can be used for example for mounting the negative current output terminal.

REFERENCE NUMERALS 1 battery
2 battery can
3 can body
4 first end
5 side wall of can body
5a inner side wall of can body
6 longitudinal axis
7 second end
8 cover assembly
9 opening
10 end edge
11 annular shoulder
12 seal
13 current output terminal
14 annular surface

The invention claimed is:

1. Battery, comprising a battery can comprising a cylindrical can body, an electrode assembly accommodated in the cylindrical can body and formed by winding an anode and a cathode that are isolated by a separator, wherein the can body has a first end forming a base, and a peripheral side wall extending from the base in a longitudinal direction to a second end of the can body comprising an opening, wherein the second end is closed by a cap assembly inserted into the can body opening to the can body, wherein the cap assembly has been attached to the can body by crimping an annular shoulder surrounding the opening inwardly such that the annular shoulder is in engagement with an upper section of the cap assembly, wherein:

the side wall of the can body ends in an end edge at the second end and the end edge of the peripheral side wall is folded in an inwardly extending loop into the annular shoulder; and inner opposing side wall surfaces of the inner annular shoulder abut each other and the end edge contacts the inner side wall of the can body, the annular shoulder has been crimped inwardly such that the end edge of the side wall is bent away from the longitudinal axis of the can body and faces the inner side wall of the can body and an end face of the side wall at the second end forms an outer flat annular surface when viewed in the longitudinal direction of the can body; and a section of the side wall has been crimped inwardly and forms an annular projection that engages a lower section of the cap assembly.

2. Battery according to claim 1, wherein the cap assembly comprises a positive current output terminal and the annular shoulder comprises a negative current output terminal, or vice versa.

3. The battery according to claim 1, wherein the battery is a lithium-ion battery.

* * * * *